(12) United States Patent
Satoh

(10) Patent No.: US 7,952,661 B2
(45) Date of Patent: May 31, 2011

(54) REFLECTION TYPE DISPLAY DEVICE AND ITS MANUFACTURING METHOD

(75) Inventor: Eiji Satoh, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 274 days.

(21) Appl. No.: 12/439,180

(22) PCT Filed: Jun. 26, 2007

(86) PCT No.: PCT/JP2007/062789
§ 371 (c)(1),
(2), (4) Date: Feb. 27, 2009

(87) PCT Pub. No.: WO2008/026368
PCT Pub. Date: Mar. 6, 2008

(65) Prior Publication Data
US 2010/0007824 A1    Jan. 14, 2010

(30) Foreign Application Priority Data
Aug. 31, 2006  (JP) ................................ 2006-235268

(51) Int. Cl.
*G02F 1/1335* (2006.01)
(52) U.S. Cl. ...................................................... 349/113
(58) Field of Classification Search ........................ None
See application file for complete search history.

(56) References Cited

U.S. PATENT DOCUMENTS
| | | |
|---|---|---|
| 6,166,856 A | 12/2000 | Araki et al. |
| 6,657,766 B2 | 12/2003 | Minoura et al. |
| 2003/0164915 A1 | 9/2003 | Fujiwara et al. |
| 2006/0146237 A1 * | 7/2006 | Minoura et al. ............... 349/113 |
| 2007/0024777 A1 * | 2/2007 | Sawayama et al. ........... 349/113 |
| 2009/0135320 A1 * | 5/2009 | Minoura et al. ................ 349/35 |
| 2010/0149456 A1 * | 6/2010 | Fujiwara et al. ................ 349/63 |

FOREIGN PATENT DOCUMENTS
| | | |
|---|---|---|
| JP | 5-107538 | 4/1993 |
| JP | 2000-19490 | 1/2000 |

OTHER PUBLICATIONS

English translation of the International Preliminary Report on Patentability mailed Mar. 12, 2009 in corresponding PCT Application No. PCT/JP2007/062789.
International Search Report for PCT/JP2007/062789, mailed Sep. 11, 2007.
Minoura, Kiyoshi et al., "P-149: Super Reflective Color LCDs Being Able to Display Moving Images without Polarizers", SID 06 Digest, (Jun. 6, 2006), pp. 769-772.

* cited by examiner

*Primary Examiner* — Sung H Pak
(74) *Attorney, Agent, or Firm* — Nixon & Vanderhye, P.C.

(57) ABSTRACT

A reflection-type display device (200) with a plurality of pixel regions (40) includes: a light modulation layer (1); a front substrate (10) and a rear substrate (12) between which the light modulation layer (1) is held; electrode structures (18 and 56) for varying optical characteristics of the light modulation layer (1) for each pixel region (40); a retroreflective layer (2) which is placed on a rear side of the light modulation layer (1); and a non-retroreflection member (53) which is placed on the rear side of the light modulation layer (1) and which has reflection characteristics different from retroreflection. The front substrate (10) includes a light shielding layer (20) which defines an opening (50) in the each pixel region (40), and the opening contains a non-retroreflection region (50*n*), which is defined by the non-retroreflection member (53), and a retroreflection region (50*r*), which is defined by the retroreflective layer (2).

10 Claims, 10 Drawing Sheets

(a)

(b)

(a)

(b)

(a)

○ PEAK POINT
● BOTTOM POINT
△ SADDLE POINT (b)  ⊗ : INCIDENT LIGHT

⊙ : RETROREFLECTED LIGHT

○ : PEAK POINT
● : BOTTOM POINT

REFLECTION TYPE DISPLAY DEVICE AND ITS MANUFACTURING METHOD

This application is the U.S. national phase of International Application No. PCT/JP2007/062789, filed 26 Jun. 2007, which designated the U.S. and claims priority to Japan Application No. 2006-235268, filed 31 Aug. 2006, the entire contents of each of which are hereby incorporated by reference.

TECHNICAL FIELD

The present invention relates to a reflection-type display device and its manufacturing method.

BACKGROUND ART

Reflection-type display devices that operate in a scattering display mode with the use of a retroreflection plate have been proposed. In the scattering display mode, a change in voltage applied to a light modulation layer such as a liquid crystal layer allows the light modulation layer to switch between a transmitting state in which light is transmitted and a scattering state in which light is scattered, and the display device utilizes this to display an image or the like. A display device using this display mode does not need a polarizing plate and may therefore have an enhanced light utilization efficiency. Another advantage resides in that the viewing angle dependence is small. The structure of this type of display device is disclosed in, for example, Patent Documents 1 to 4.

The operation principle of the above-mentioned reflection-type display device is described below with reference to FIGS. 1(a) and 1(b). FIGS. 1(a) and 1(b) are diagrams illustrating display device's "black" displaying state and "white" displaying state, respectively. The "white displaying state" here refers to a display state in which the liquid crystal layer is in the scattering state. Accordingly, in the case of color display, the highest gray scale in gray scale display is called a "white displaying state" irrespective of what color is displayed. The "black displaying state," on the other hand, refers to a display state in which the liquid crystal layer is in the transmitting state, and indicates the lowest gray scale in gray scale display.

As illustrated in FIG. 1(a), when a light modulation layer (here, scattering-type liquid crystal layer) 1 is controlled to keep the transmitting state, what a viewer 6 sees is the retroreflection plate itself. Incident light 3 from a light source 5, which is outside the display device, passes through the light modulation layer 1 and then reflected by a retroreflection plate 2 toward a direction in which the light has entered (reflected light 4b). Light from the light source 5 therefore does not enter the eyes of the viewer 6, and the "black" displaying state is obtained.

When the light modulation layer 1 is controlled to keep the scattering state, the incident light 3 from the light source 5 is scattered by the light modulation layer 1 as illustrated in FIG. 1(b). In the case where the light modulation layer 1 is a forward scattering-type liquid crystal layer, most of the incident light 3 is scattered forward by the light modulation layer 1, reflected by the retroreflection plate 2, and then exits to the side of the viewer 6 through the light modulation layer 1 in the scattering state (reflected light 4w). Scattering by the light modulation layer 1 nullifies the retroreflection of the retroreflection plate 2, thereby preventing the incident light 3 from traveling back to the incident direction. Part of the incident light 3 is scattered backward by the light modulation layer 1 and exits to the side of the viewer 6 (not shown). The display device in this case is in the "white" displaying state because part of the light that has exited to the side of the viewer 6 reaches the eyes of the viewer 6. According to this operation principle, the forward scattering as well as backward scattering of the light modulation layer 1 may be utilized effectively, and the obtained "white" display is therefore brighter.

The retroreflection plate 2 illustrated in FIG. 1 may be a layer that has retroreflection characteristics (retroreflective layer). Corner cube arrays, microsphere arrays, microlens arrays, and other arrays in which unit components (corner cubes, microspheres, or the like) are arranged two-dimensionally may be employed.

A corner cube array is an array of two-dimensionally-arranged corner cubes each of which is constituted by three faces orthogonal to one another. Light incident on a corner cube is, ideally, reflected by three faces that constitute this corner cube to return to the same direction as the incident direction. The use of a corner cube array which may have a high retroreflection rate improves the display contrast ratio of a reflection-type display device. Patent Document 3 describes that the display contrast ratio of a reflection-type display device employing a corner cube array is enhanced further by using a corner cube array that is made up of minute corner cubes as a retroreflection plate. A corner cube array made up of minute corner cubes (arrangement pitch: 5 mm or less, for example) is called herein as a micro corner cube array "(MCCA)".

The structure of a reflection-type display device that uses an MCCA as a retroreflection plate is described next.

A reflection-type display device using an MCCA may have, for example, a structure in which the MCCA is placed across a display panel from the viewer. A structure like this where the MCCA is placed outside of the display panel (hereinafter referred to as "external MCCA structure") is disclosed in, for example, Patent Document 4. A "display panel" herein refers to a panel structured such that a light modulation layer such as a liquid crystal layer and voltage application means for applying a voltage to the light modulation layer are formed between two opposing substrates. Of the two opposing substrates, a substrate that is on the viewer side is called a "front substrate" and a substrate on the opposite side from the viewer is called a "rear substrate". In an external MCCA structure, the MCCA is placed on the rear side of the rear substrate.

Reflection-type display devices having a structure in which the MCCA is placed between the two substrates of the display panel (hereinafter referred to as "internal MCCA structure") have also been proposed. For instance, the aforementioned Patent Document 3 describes a structure in which the retroreflective layer is placed between the modulation layer and the rear substrate in the display panel.

A concrete description is given below with reference to drawings on the conventional structure of a reflection-type display device having a retroreflection plate (retroreflection-type display device). The description takes as an example a reflection-type liquid crystal display device that has an external MCCA structure.

FIG. 2(a) is a plan view illustrating a state of wiring lines and electrodes on the rear substrate of the conventional retroreflection-type liquid crystal display device. FIG. 2(b) is a diagram illustrating the structure of the conventional retroreflection-type liquid crystal display device, which is a schematic cross-sectional view taken along lines II-II' and II'-II" in the plan view of FIG. 2(a).

A display device 100 includes a front substrate 10 and a rear substrate 12 disposed so as to be opposed to the front substrate 10. Between the substrates 10 and 12, a light modulation layer (here, scattering-type liquid crystal layer) X which is capable of taking a scattering state or a transmitting state is provided. A retroreflective layer 2 is provided on a side of the rear substrate 12 that is opposite from the light modulation layer 1.

Formed on the same side of the rear substrate 12 as the light modulation layer 1 are a plurality of thin film transistors (TFTs) 13, which function as switching elements, source lines 14, gate lines 15 for selectively driving the thin film transistors 13, and others. A plurality of pixel electrodes 16 are placed above the thin film transistors 13, the source lines 14, and the gate lines 15, with a transparent resin layer 22 in-between. These pixel electrodes 16 each define a pixel, which constitutes one unit of displaying an image. Each pixel electrode 16 is electrically connected to a drain electrode 13d of its associated thin film transistor 13 through a contact portion 24 provided in the transparent resin layer 22.

The pixel electrodes 16 are formed by using an electrically conductive material which transmits light, e.g., indium tin oxide (ITO). As illustrated in FIG. 2(b), the pixel electrodes 16 are disposed so as to be spaced apart, thus defining pixels, each of which is one unit of image displaying. On the other hand, generally, wiring lines such as the source lines 14 and the gate lines 15 are formed by using a metal material, e.g., tantalum. Though not illustrated, the wiring lines 14 and 15 are respectively connected to a source driver and a gate driver in a driving circuit which is provided on the rear substrate 12.

On the front substrate 10, a counter electrode 18 including color fitters 19, a black matrix 20, and a transparent conductive film is provided. The color filters 19 are provided for the respective pixels. The black matrix 20 is disposed between adjoining pixels and in the neighborhood of the display region so as to shield the wiring lines 14 and 15 and the thin film transistor 13 against light. Typically, the width of the black matrix 20 is set sufficiently larger than the width of each source line 14 (d>0), or substantially equal to the width of each source line 14 (d=0).

In the display device 100, by controlling the voltage which is applied between the counter electrode 18 and the pixel electrode 16, it becomes possible to switch the light modulation layer 1 between a scattering state and a transmitting state in each pixel.

[Patent Document 1] JP 05107538 A
[Patent Document 2] JP 2000-19490 A
[Patent Document 3] JP 2002-107519 A
[Patent Document 4] JP 11-15415 A

DISCLOSURE OF INVENTION

Problems to be Solved by the Invention

The inventors of the present invention has found out through a study a problem with the retroreflection-type display device 100 exemplified in FIGS. 2(a) and 2(b) in that, when the light modulation layer 1 is in the scattering state (i.e., white displaying state), the displayed image is not bright enough in some viewing directions.

The above-mentioned problem is described in more detail with reference to drawings.

First, FIG. 3(a) is referred to. In the white displaying state, light incident on the display device 100 from the light source 5 passes through the light modulation layer 1 before reflected back to a direction 30 of the light source 5 ("retroreflection direction") by the retroreflective layer 2. The light is then scattered again by the light modulation layer 1 and exits to the viewer side. Scattered light La which exits to the viewer side after scattered by the light modulation layer 1 in this manner has an angle distribution centered around the retroreflection direction 30 as schematically illustrated in the drawing. Accordingly, when the retroreflection direction 30 and the viewing direction of the viewer 6 are relatively close so that part of the scattered light La which is denoted by Lo exits in the viewing direction as illustrated in the drawing, the light Lo contributes to the brightness of the displayed image.

Referring to FIG. 3(b), a contrasting case is examined in which the exit direction of the scattered light La is significantly distant from the viewing direction of the viewer 6. As illustrated in the drawing, when the viewing direction and the retroreflection direction (i.e., direction of the light source 5) 30 are far from each other with respect to the normal line direction of the substrates 10 and 12, the light La scattered by the light modulation layer 1 does not have sufficient intensity in the viewing direction, with the result that the displayed image is not bright enough.

This problem could be lessened by enhancing the scattering power of the light modulation layer 1. However, enhancing the scattering of the light modulation layer 1 increases the proportion of light that is trapped as a result of total reflection by the surface of the front substrate 10, namely, light that does not exit to the viewer side due to a refractive index difference at the interface between the display panel and the air, to the light La scattered by the light modulation layer 1. This lowers the light utilization efficiency. In addition, enhancing the scattering power of a scattering-type liquid crystal layer used as the light modulation layer 1 generally raises the drive voltage.

Conventional retroreflection-type display devices thus have a problem in that the displayed image is not bright and is low in visibility depending on the direction in which a viewer views the display panel.

The present invention has been made in view of the above-mentioned circumstances, and an object of the present invention is therefore to improve the brightness and visibility of white displaying in a retroreflection-type display device that uses a scattering display mode.

Means for Solving the Problems

A reflection-type display device according to the present invention is a reflection-type display device with a plurality of pixel regions, including: a light modulation layer; a front substrate and a rear substrate between which the light modulation layer is held; an electrode structure for varying optical characteristics of the light modulation layer for each pixel region; a retroreflective layer which is placed on a rear side of the light modulation layer; and a non-retroreflection member which is placed on the rear side of the light modulation layer and which has reflection characteristics different from retroreflection, in which the front substrate includes a light shielding layer which defines an opening in the each pixel region, and in which the opening contains a non-retroreflection region, which is defined by the non-retroreflection member, and a retroreflection region, which is defined by the retroreflective layer.

In a preferred embodiment, when viewed from a normal line direction of the rear substrate, the non-retroreflection region takes up ⅓ or less of an entire area of the opening.

The non-retroreflection region may be disposed at a rim of the opening.

The retroreflective layer may be placed across the rear substrate from the light modulation layer.

In a preferred embodiment, the non-retroreflection member is interposed between the retroreflective layer and the light modulation layer to reflect part of light entering the retroreflective layer from a viewer side in a direction different from a retroreflection direction.

In a preferred embodiment, the reflection-type display device further includes wiring lines which are formed on the rear substrate, and part of the wiring lines is placed within the opening to function as the non-retroreflection member.

In a preferred embodiment, the electrode structure includes: a counter electrode, which is formed on the front substrate; and pixel electrodes, which are formed on the rear substrate and spaced apart from one another for the each pixel region, the pixel electrodes each include: a reflective metal layer; and a transparent conductive layer, and at least part of the reflective metal layer is placed within the opening to function as the non-retroreflection member.

In a preferred embodiment, the electrode structure includes: a counter electrode, which is formed on the front substrate; and pixel electrodes, which are formed on the rear substrate and spaced apart from one another for the each pixel region, the reflection-type display device further includes a reflective metal layer, which is placed between the pixel electrodes and the retroreflective layer, and at least part of the reflective metal layer is placed within the opening to function as the non-retroreflection member.

The wiring lines formed on the rear substrate are preferably shielded against light by the light shielding layer and the reflective metal layer.

The non-retroreflection member preferably includes a substantially flat non-retroreflection region.

The non-retroreflection region may be parallel to the rear substrate.

Another reflection-type display device according to the present invention is a reflection-type display device with a plurality of pixel regions, including: a light modulation layer; a front substrate and a rear substrate between which the light modulation layer is held; an electrode structure for varying optical characteristics of the light modulation layer for each pixel region; and a retroreflective layer which is placed between the rear substrate and the light modulation layer, and which has a plurality of unit features arranged two-dimensionally, in which the front substrate includes a light shielding layer which defines an opening in the each pixel region, in which the retroreflective layer includes a plurality of reflection electrodes, which are spaced apart from one another for the each pixel region. The reflection-type display device further includes: a plurality of switching elements which are formed on the rear substrate; and a contact portion which electrically connects each of the reflection electrodes with its associated switching element, in which the plurality of reflection electrodes each include, within the opening: a retroreflection region, which includes the plurality of unit features; and a substantially flat non-retroreflection region, and in which the non-retroreflection region is placed above the contact portion and, when viewed from a normal line direction of the rear substrate, is larger in area than each unit feature.

Effects of the Invention

According to the present invention, the retroreflection-type display device that uses a scattering display mode may display a bright image at excellent visibility in any viewing direction by providing the non-retroreflection region in the opening.

The width of a light shielding layer formed on the front substrate may be set narrower than in prior art, and the non-retroreflection region is placed in a part that would conventionally be shielded by the light shielding layer. This improves the substantial aperture ratio and therefore is advantageous.

Figure 1:
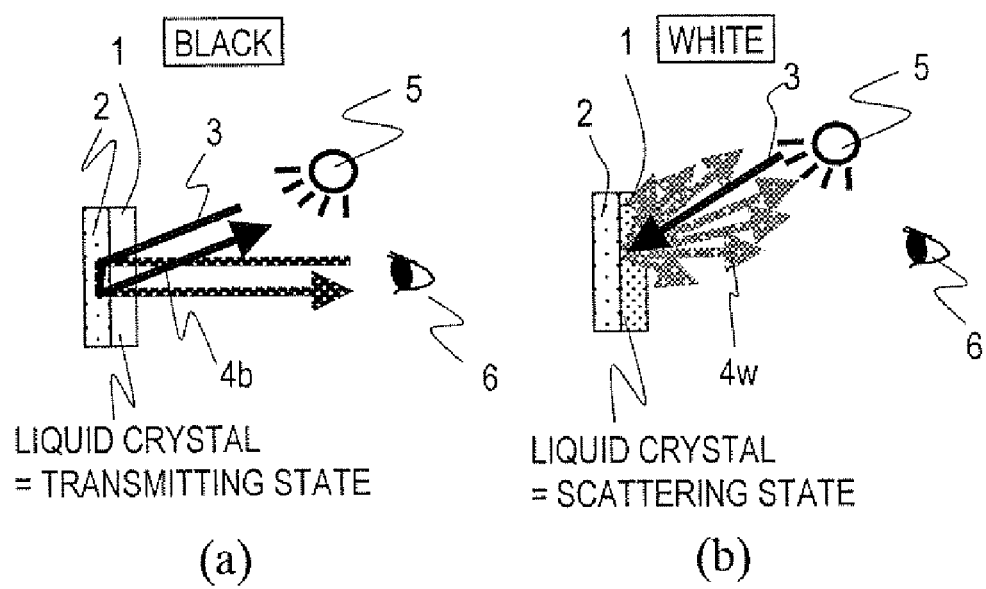
FIGS. 1(a) and 1(b) are diagrams illustrating an operation principle of a retroreflection-type liquid crystal display device.

DESCRIPTION OF REFERENCE NUMERALS 1 light modulation layer
2 retroreflective layer (retroreflection plate)
5 light source
6 viewer 10 front substrate
12 rear substrate
13 switching element (thin film transistor)
13d drain electrode
14 source line
15 gate line
16, 56 pixel electrode
18 counter electrode
19 color filter
20 black matrix
22 transparent resin layer
24 contact portion
40, 60, 80, 110 pixel region
50, 70, 90, 120 opening
50n, 70n, 90n, 120n non-retroreflection region
50r, 70r, 90r, 120r retroreflection region
51 transparent conductive layer
53, 71, 98 reflective metal layer
100, 200, 300, 400, 500 display device

BEST MODE FOR CARRYING OUT THE INVENTION

In preferred embodiments of a reflection-type display device according to the present invention, a retroreflective layer and a non-retroreflection member are provided on the rear side of a light modulation layer, and a non-retroreflection region, which is defined by the non-retroreflection member, and a retroreflection region, which is defined by the retroreflective layer, are disposed within an opening in a pixel region. The term "non-retroreflection member" herein means a member having reflection characteristics that are not retroreflection (specular reflection characteristics, diffuse reflection characteristics, or the like). The "opening" herein refers to a portion that is defined by a light shielding layer (e.g., black matrix) provided on a front substrate and that contributes to the displaying of an image.

Advantages of placing not only a retroreflection plate but also a non-retroreflection member in an opening are described below with reference to FIGS. 4(a) and 4(b).

Figure 3:
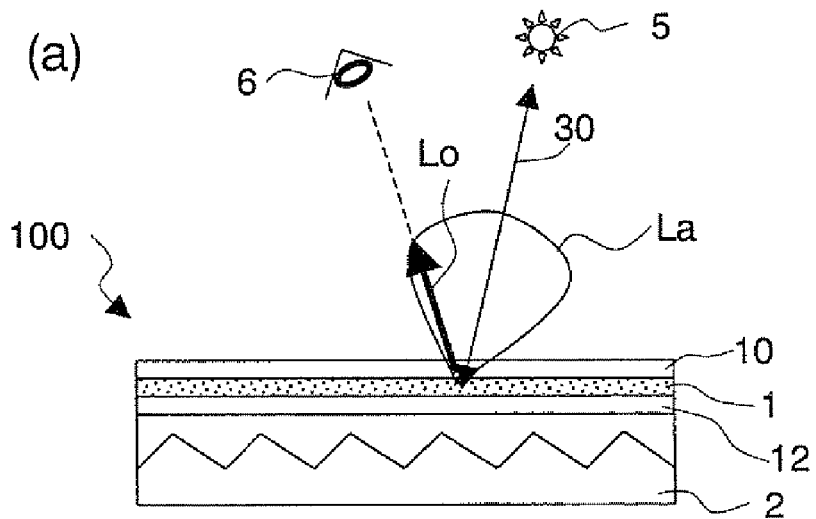
FIGS. 3(a) and 3(b) are diagrams illustrating a relation between a viewing direction and brightness of white displaying in the conventional retroreflection-type liquid crystal display device.
Figure 3:
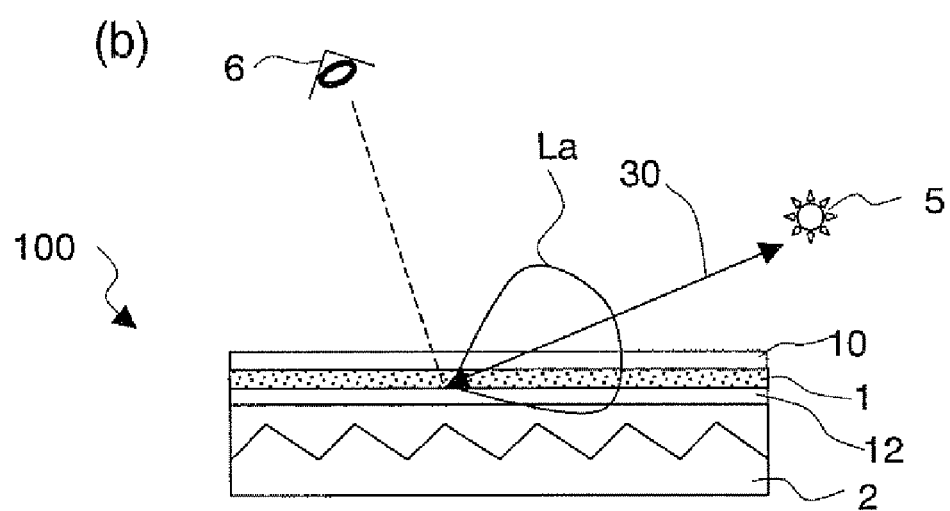

A display device 200 is a retroreflection-type display device that is equipped with the non-retroreflection member. Here, a plane mirror disposed substantially parallel to a substrate surface of the reflection-type display device is employed as the non-retroreflection member. For the sake of simplification, components similar to those of the display device 100 illustrated in FIGS. 3(a) and 3(b) are denoted by the same reference symbols.

First, FIG. 4(a) is referred to. In the white displaying state, light from a light source 5 passes through a light modulation layer 1 within an opening of the display device 200 and enters a retroreflective layer 2 or the plane mirror (not shown). Light incident on the retroreflective layer 2 is reflected toward a direction 30 of the light source 5 (retroreflection direction), and then scattered once more by the light modulation layer 1 to exit to the viewer side (scattered light La). The scattered light La has, as described above with reference to the schematic diagram of FIG. 3(a), an angle distribution centered around the retroreflection direction 30. On the other hand, light incident on the plane mirror is reflected in a regular reflection direction 32 by the plane mirror, and then scattered once more by the light modulation layer 1 to exit to the viewer side (scattered light Lb). The scattered light Lb has an angle distribution centered around the regular reflection direction 32 as schematically illustrated in the drawing. As illustrated in the drawing, when the viewing direction of a viewer 6 is relatively close to the retroreflection direction 30 and the regular reflection direction 32, and the scattered light La and the scattered light Lb are intense enough in the viewing direction, highly intense light Lo, which contains the scattered light Lb as well as the scattered light La, contributes to making the displayed image extremely bright.

The conventional display device 100, too, may display a bright image owing to the scattered light La when the retroreflection direction 30 and the viewing direction are relatively close to each other, as has been described with reference to FIG. 3(a). The display device 200, which displays utilizing the scattered light Lb that the non-retroreflection member reflects in addition to the scattered light La, is further enhanced in brightness of white displaying.

A case in which the viewing direction of the viewer 6 is significantly distant from the retroreflection direction 30 is considered next with reference to FIG. 4(b). As illustrated in the drawing, when the viewing direction and the retroreflection direction 30 are far from each other with respect to the normal line direction of substrates 10 and 12, the light La scattered by the light modulation layer 1 after reflected by the retroreflective layer 2 does not have sufficient intensity in the viewing direction. Nevertheless, the displayed image is bright because the light Lo, which is part of the light Lb scattered by the light modulation layer 1 after regularly reflected by the plane mirror, exits toward the viewing direction and contributes to the displaying of an image. The display device 200 is therefore greatly improved in brightness of white displaying compared to the conventional display device 100, which has been described with reference to FIG. 3(b).

The display device 200 in the white displaying state thus displays utilizing (1) the scattered light La, which is light traveling through the light modulation layer 1 within the opening, then reflected by the retroreflective layer 2 toward the light source direction (retroreflection direction) 30, and then scattered by the light modulation layer 1 to exit to the viewer side, and (2) the scattered light Lb, which is light traveling through the light modulation layer 1 within the opening, then reflected by the non-retroreflection member, and then scattered by the light modulation layer 1 to exit to the viewer side, as well. The display device 200 may accordingly display a brighter image than the conventional display device 100, which utilizes the scattered light La alone. Also, while the conventional display device 100 has a problem in that the white displaying characteristics are markedly poor in some viewing directions as described with reference to FIG. 3, the present invention may expand the angle distribution of light that contributes to the displaying of an image (i.e., scattered light La and Lb) and may thus prevent the white displaying characteristics from deteriorating depending on the viewing direction.

Figure 4:
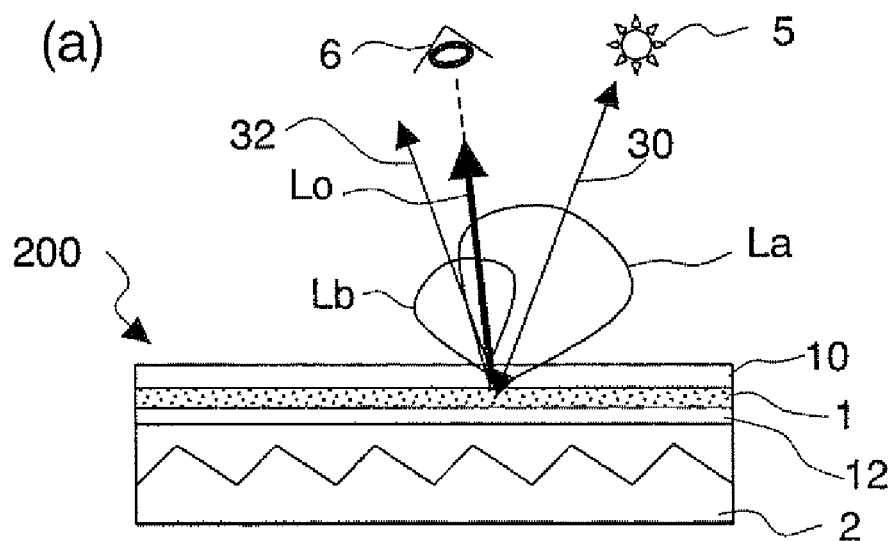
FIGS. 4(a) and 4(b) are diagrams illustrating a relation between a viewing direction and brightness of white displaying in a retroreflection-type liquid crystal display device according to embodiments of the present invention.
Figure 4:
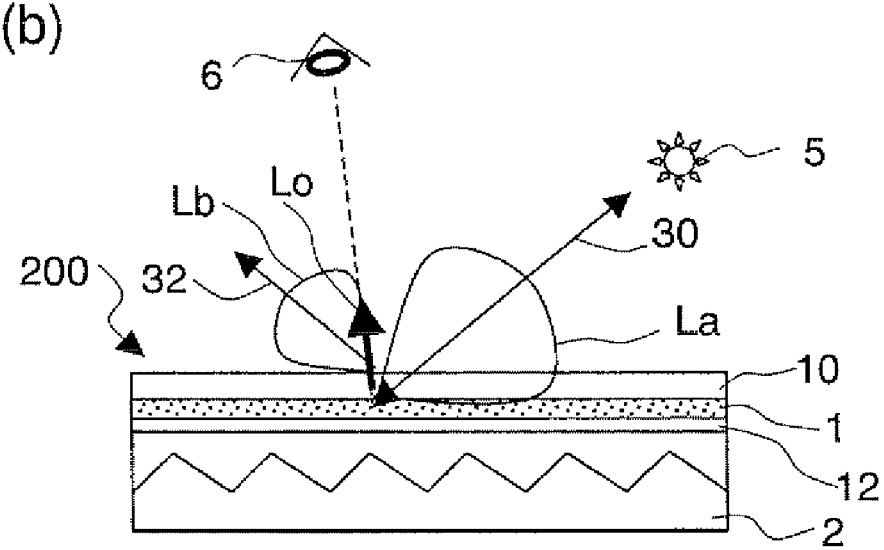

The non-retroreflection member is not limited to a plane mirror. Any member that has other reflection characteristics than retroreflection characteristics enables the display device 200 to utilize the scattered light Lb, which differs from the scattered light La, in displaying an image and may therefore improve the brightness of white displaying, though the exit direction and intensity of the scattered light Lb vary depending on what reflection characteristics the member has. However, a non-retroreflection member having a planar surface is preferred because such a non-retroreflection member hardly causes scattering in the black displaying state as well and therefore leads to excellent display quality. The non-retroreflection member more desirably has a planar surface that is parallel to the surface of the rear substrate 12, and hence the brightness of white displaying may be improved more effectively by utilizing for the displaying of an image the scattered light La which exits in directions centered around the retroreflection direction and the scattered light Lb which exits in directions centered around the regular reflection direction as illustrated in FIG. 4.

First Embodiment

A first embodiment of a display device according to the present invention is described below with reference to the drawings. The display device of this embodiment is a retroreflection-type liquid crystal display device using a scattering-type liquid crystal, and has an external MCCA structure. A non-retroreflection member in this embodiment is a reflective metal layer formed from reflective metal such as silver (Ag), and has a surface containing a plane that exhibits specular reflection characteristics (plane mirror). A reflective metal layer as this is provided in each pixel region, and also functions as part of a pixel electrode.

Figure 5:
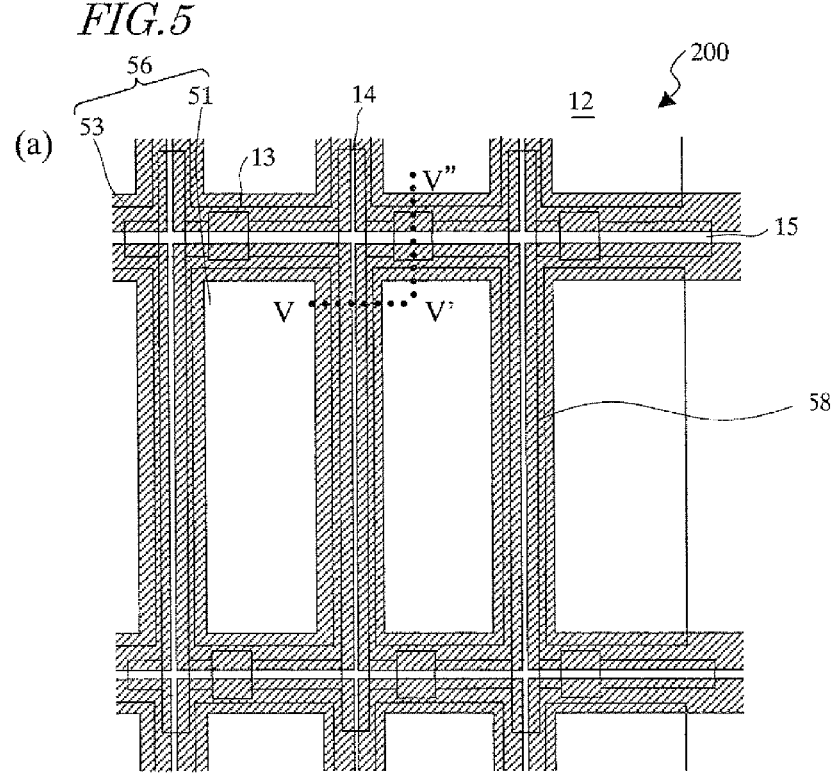
FIGS. 5(a) and 5(b) are diagrams illustrating a structure of a retroreflection-type liquid crystal display device according to a first embodiment of the present invention, with FIG. 5(a) illustrating in plan view a state of wiring lines and electrodes on a rear substrate of the retroreflection-type liquid crystal display device and FIG. 5(b) schematically illustrating the retroreflection-type liquid crystal display device in sectional view taken along lines V-V' and V'-V'' of FIG. 5(a).
Figure 5:
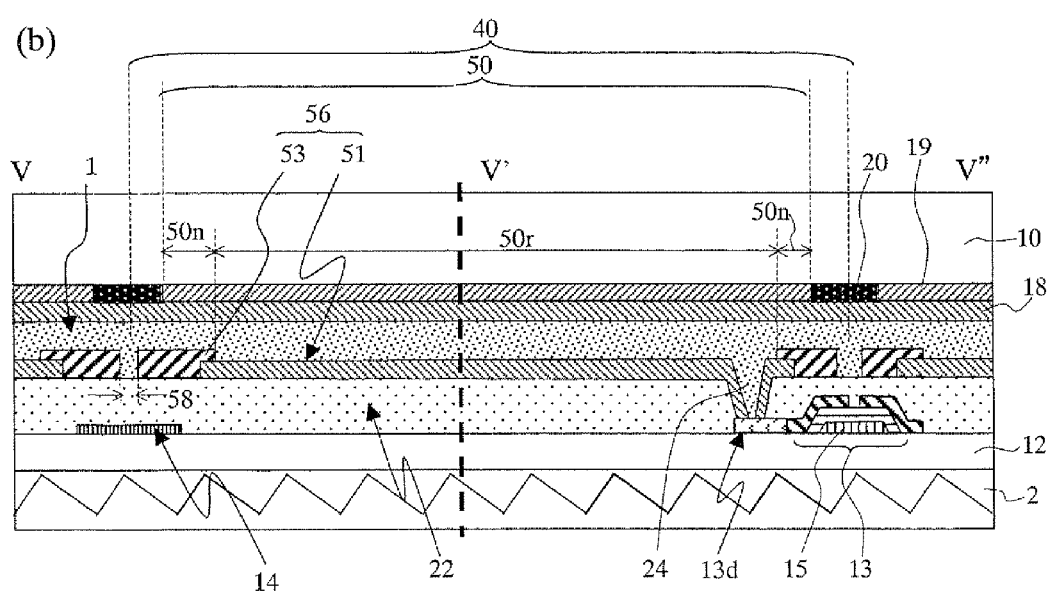

FIG. 5(a) is a plan view illustrating a state of wiring lines and electrodes on a rear substrate of the display device according to this embodiment. FIG. 5(b) is a diagram illustrating the display device of this embodiment, specifically, a schematic sectional view taken along lines V-V' and V'-V'' in the plan view of FIG. 5(a). For the sake of simplification, components that are the same as those of the display device 100 are denoted by the same reference symbols and their descriptions are omitted.

The display device 200 includes a plurality of pixel electrodes 56 on the same side of the rear substrate 12 as the light modulation layer 1, with a transparent resin layer 22 interposed between the rear substrate 12 and the pixel electrodes 56. The pixel electrodes 56 each include a transparent conductive layer 51, which is formed from a transparent conductive material such as ITO, and a reflective metal layer (here, Ag layer) 53, which is placed at the rim of the transparent conductive layer 51 and electrically connected to the transparent conductive layer 51. The reflective metal layer 53 here is disposed to hem the transparent conductive layer 51 and to partially cover source lines 14 and gate lines 15, which are formed on the rear substrate 12. The pixel electrodes 56 are spaced apart from one another and each define a pixel region 40, which constitutes one unit of pixel display. A gap 58 between adjoining pixel electrodes 56 is covered with a black matrix 20 formed on the front substrate 10. Each pixel region 40 has substantially at its center a portion (opening) 50 that is not shielded against light by the black matrix 20.

The "pixel region 40" in this embodiment corresponds to a pixel, which is the smallest unit of displaying an image. The area of each pixel region 40 is expressed as Px×Py where a pitch between the pixel electrodes 56 in the row direction is given as Px and a pitch between the pixel electrodes 56 in the column direction is given as Py.

In this embodiment, at least part of the reflective metal layer 53 is placed in the opening 50 and functions as a non-retroreflection member. Specifically, part of light that is about to enter the retroreflective layer 2 from the viewer side of the display device 200 is reflected in a direction different from the retroreflection direction (for example, regular reflection direction).

Figure 6:
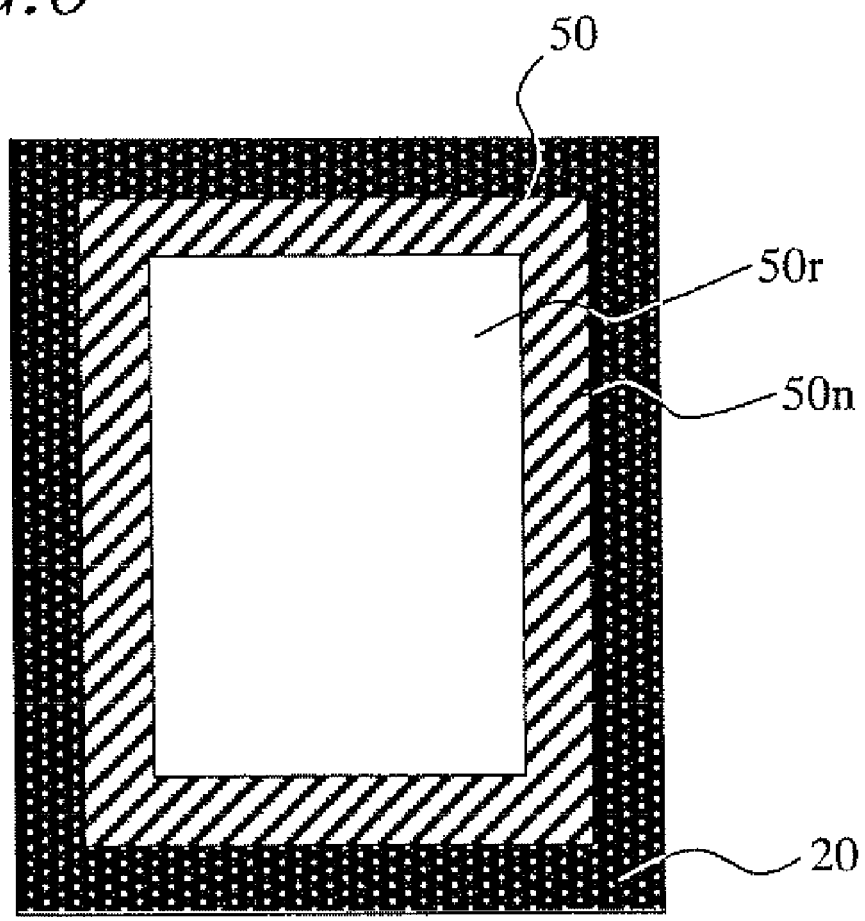
FIG. 6 is a plan view illustrating a structure of an opening according to the first embodiment of the present invention.

FIG. 6 is a plan view illustrating a single opening 50 in the display device 200 viewed from the normal line direction of the substrates 10 and 12. As illustrated in the drawing, the opening 50 is a part that is not covered with the black matrix 20, and includes a non-retroreflection region 50n, which reflects incident light in a direction other than the retroreflection direction, and a retroreflection region 50r, which reflects incident light in the retroreflection direction. Accordingly, light incident on the opening 50 from the viewer side is reflected by any one of the non-retroreflection region 50n and the retroreflection region 50r. In this embodiment, the non-retroreflection region 5 on is defined by a part of a surface of the reflective metal layer 53 that is not shielded against light by the black matrix 20, whereas the retroreflection region 50r is defined by a part of the retroreflective layer 2 that is not shielded against light neither by the black matrix 20 nor by the reflective metal layer 53.

The opening 50 in this embodiment is thus provided with the non-retroreflection region 50n as well as the retroreflection region 50r. The displayed image is consequently bright and high in visibility in any viewing direction as has been described with reference to FIGS. 4(a) and 4(b).

In the conventional display device 100 described with reference to FIGS. 2(a) and 2(b), the source lines 14 and the gate lines 15 need to be placed in a region that is shielded against light by the black matrix 20, and the width of the black matrix 20 therefore may not be set smaller than the width of the wiring lines 14 and 15. Further, the black matrix 20 needs to be even wider if gaps from the pixel electrode 16 to the wiring lines 14 and 15, too, are to be shielded against light, and the aperture ratio is accordingly lowered. In this embodiment, on the other hand, the black matrix 20 needs to shield only the gap 58 between adjoining pixel electrodes 56 against light and may therefore be reduced in width. The substantial aperture ratio is improved as a result.

The reflective metal layer 53 is preferably disposed to shield against light the wiring lines 14 and 15 formed on the rear substrate 12, except the parts that are shielded against light by the black matrix 20. In this way, the reflective metal layer 53 and the black matrix 20 almost completely shield the wiring lines 14 and 15 against light, thereby avoiding the deterioration of displaying characteristics (black displaying characteristics, in particular) due to light incident on surfaces of the wiring lines 14 and 15.

In the plan view of FIG. 6, a ratio Rn of the area of the non-retroreflection region 50n to the opening 50 and a ratio Rr of the area of the retroreflection region 50r to the opening 50 may be set suitably. The ratio Rn of the area of the non-retroreflection region 50n to the opening 50 is preferably 3% or higher (e.g., 10% or higher) because, at that ratio, the enhancement in brightness of white displaying is ensured more firmly and the display contrast ratio is improved. On the other hand, the ratio Rn of the area of the non-retroreflection region 50n is preferably 50% or lower of the ratio Rr of the area of the retroreflection region 50r, in other words, the ratio Rn of the non-retroreflection region 50n to the opening 50 is ⅓ or less. This is because, when the ratio Rn of the area of the non-retroreflection region 50n exceeds ⅓, a viewer catches with his/her eyes an accidental reflection on the display monitor of the display device 200 that is caused by specular reflection by the reflective metal layer 53 and that lowers the visibility. The ratio Rn of the area of the non-retroreflection region 50n is more desirably 20% or lower of the ratio Rr of the area of the retroreflection region 50r, in other words, the ratio Rn of the area of the non-retroreflection region 50n to the opening 50 is ⅙ or less. In this way, black displaying that is not as dark as intended ("dark-state leakage"), or worse, inversion in gray scale display ("gray scale inversion") is prevented when the display device 200 is viewed from a direction near the regular reflection direction of incident light emitted by the light source 5.

The "ratio Rn of the area of the non-retroreflection region 50n to the opening 50" and the "ratio Rr of the area of the retroreflection region 50r to the opening 50" herein rarer to, respectively, the area ratio of the non-retroreflection region 50n to the area of the opening 50 and the area ratio of the retroreflection region 50r to the area of the opening 50 that are viewed from the normal line direction of the substrate surface. In the case where a plurality of non-retroreflection regions 50n are placed in a single opening 50, the area of the non-retroreflection region 50n means the total area of those non-retroreflection regions 50n. The same applies to a case where a plurality of retroreflection regions 50r are placed in a single opening 50.

An example of how the reflective metal layer 53 is formed in this embodiment is described subsequently.

First, the transparent resin layer 22 is formed on the rear substrate 12 where thin film transistors 13 and the wiring lines 14 and 15 have been formed. An ITO film is formed by deposition on the transparent resin layer 22 and patterned to obtain a plurality of transparent conductive layers 51. Thereafter, a film of reflective metal (here, Ag film) is formed by deposition on the transparent resin layer 22 and the transparent conductive layers 51 and patterned, to thereby form the reflective metal layer 53 electrically connected to the relevant transparent conductive layer 51.

The formation method for the reflective metal layer 53 is not limited to the above-mentioned method. For example, the reflective metal layer 53 may be formed before the transparent conductive layers 51 are formed, in which case the reflective metal layer 53 is placed below the transparent conductive layers 51. The material of the reflective metal layer 53 may not be Ag but an Ag alloy such as AgPd or AgPdCu.

The arrangement and shapes of the reflective metal layer 53 and the transparent conductive layers 51 in this embodiment are not limited to the arrangement and shapes illustrated in the drawings. The reflective metal layer 53 in this embodiment may function as a non-retroreflection member and as a pixel electrode when placed between the light modulation layer 1 and the retroreflective layer 2 and connected electrically to the relevant transparent conductive layer 51. While part of the reflective metal layer 53 overlaps with the transparent conductive layer 51 in the example of the drawings, the entirety of the reflective metal layer 53 may overlap with the transparent conductive layer 51. Alternatively, the reflective metal layer 53 may be placed such that the reflective metal layer 53 does not overlap with the transparent conductive layer 51 but is in contact with an end face of the transparent conductive layer 51.

The reflective metal layer 53 may have specular reflection characteristics, diffuse reflection characteristics, or any other reflection characteristics as long as they are not of retroreflection. Preferably, of a surface of the reflective metal layer 53, at least a part that functions as the non-retroreflection region 50n (part that is located in the opening 50) is a planar surface (plane mirror) having specular reflection characteristics. More desirably, this planar surface is disposed substantially parallel to the surfaces of the substrates 10 and 12. In this way, the deterioration of white displaying characteristics in some viewing directions is lessened more effectively as has been described with reference to FIGS. 4(a) and 4(b).

While placing the reflective metal layer 53 in at least part of the opening 50 is sufficient, arranging the reflective metal layer 53 at the rim of the transparent conductive layer 51 as described above is preferred because it raises the substantial aperture ratio compared to prior art and improves the light utilization efficiency. In that case, placing the reflective metal layer 53 along at least part of the rim of the transparent conductive layer 51, for example, on any one of the gate line 15 and the source line 14, is enough to obtain the effect of improving the brightness of white displaying. Further, it is sufficient if the reflective metal layer 53 is placed in at least one of the openings 50 that constitute the display device 200.

The display device 200 has an external MCCA structure but the same effect is obtained when the reflective metal layer 53 is placed between the retroreflective layer 2 and the light modulation layer 1 in a display device with an internal MCCA structure in which the retroreflective layer 2 is placed inside a display panel. The reflective metal layer 53 in this case may be disposed above a contact portion where the retroreflection shape of the retroreflective layer 2 tends to be lost.

Second Embodiment

A second embodiment of a display device according to the present invention is described below with reference to the drawings. The display device of this embodiment is a retroreflection-type liquid crystal display device using a scattering-type liquid crystal, and has an external MCCA structure. In this embodiment, wiring lines formed on a rear substrate are utilized as a non-retroreflection member.

FIG. 7(a) is a plan view illustrating a state of the wiring lines and electrodes on the rear substrate of the display device according to this embodiment. FIG. 7(b) is a diagram illustrating the display device of this embodiment, specifically, a schematic sectional view taken along lines VII-VII' and VII'-VII" in the plan view of FIG. 7(a). For the sake of simplification, components that are the same as those of the display device 100 are denoted by the same reference symbols and their descriptions are omitted.

The width of the black matrix 20 in a display device 300 is smaller than the width of the source line 14 and the gate line 15, and hence the source line 14, the gate line 15, and the thin film transistor 13 are, at least partially, not under the black matrix 20 and placed in an opening 70 in an exposed state. The "opening 70" is a part of a pixel region 60 that is not shielded against light by the black matrix 20. In the display device 300, an end of the pixel electrode 16 and an end of the black matrix 20 substantially coincide with each other in a direction in which the layers are laminated, but the black matrix 20 may overlap with part of the pixel electrode 16. The rest of the structure of the display device 300 is the same as that of the display device 100 described above with reference to FIGS. 2(a) and 2(b), and components similar to those of the display device 100 are denoted by the same reference symbols in order to omit their descriptions.

In this embodiment, the wiring lines 14 and 15 and the thin film transistor 13 formed on the rear substrate 12 are at least partially disposed in the opening 70 to function as a non-retroreflection member. Specifically, part of light that is about to enter the retroreflective layer 2 from the viewer side of the display device 300 is reflected in a direction different from the retroreflection direction by specular reflection or diffuse reflection. The brightness in the white displaying state is thus improved as has been described with reference to FIGS. 4(a) and 4(b).

In the conventional display device 100 described with reference to FIGS. 2(a) and 2(b), the source lines 14 and the gate lines 15 need to be placed in a region that is shielded against light by the black matrix 20, and the width of the black matrix 20 therefore may not be set smaller than the width of the wiring lines 14 and 15. In this embodiment, on the other hand, the width of the black matrix 20 is smaller than the width of the wiring lines 14 and 15 and, accordingly, the substantial aperture ratio is higher than in prior art.

This embodiment is similar to the above-mentioned first embodiment in that the opening 70 has a non-retroreflection region 70n and a retroreflection region 70r. The non-retroreflection region 70n is defined by a part of surfaces of the source line 14, the thin film transistor 13, and the gate line 15 that is not shielded against light by the black matrix 20. The retroreflection region 70r is defined by a part of the retroreflective layer 2 that is not shielded against light neither by the black matrix 20 nor by the wiring lines 14 and 15. In the display device 300, the non-retroreflection region 70n is disposed to hem the retroreflection region 70r.

A ratio Rn of the non-retroreflection region 70n to the opening 70 and a ratio Rr of the retroreflection region 70r to the opening 70 have the same preferred ranges as in the first embodiment. In this embodiment, the ratio Rn of the non-retroreflection region 70n to the opening 70 may be adjusted by choosing the width of the source lines 14 and the gate lines 15 and the width of the black matrix 20 appropriately.

Figure 2:
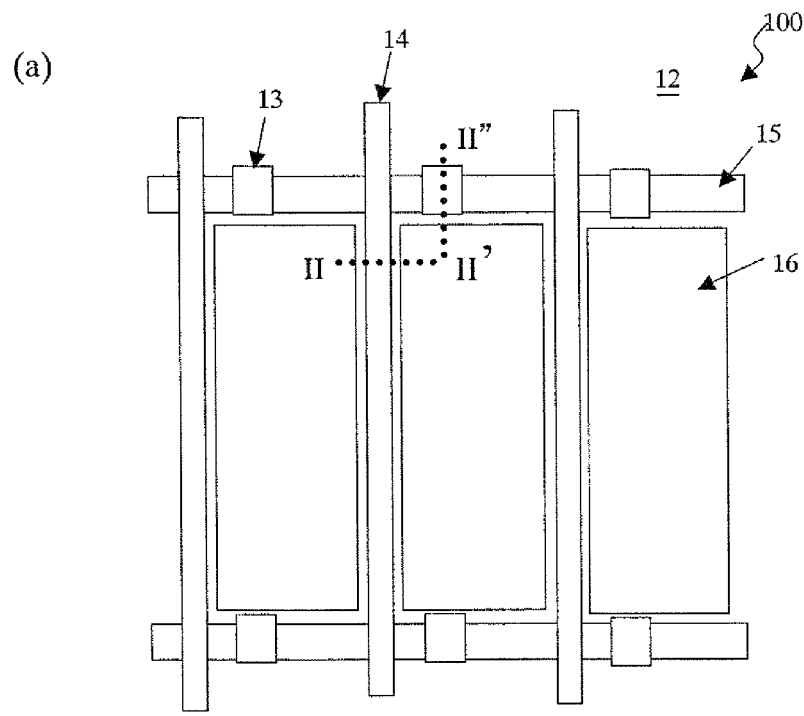
FIGS. 2(a) and 2(b) are diagrams illustrating a structure of a conventional retroreflection-type liquid crystal display device, with FIG. 2(a) illustrating in plan view a state of wiring lines and electrodes on a rear substrate of the retroreflection-type liquid crystal display device and FIG. 2(b) schematically illustrating the retroreflection-type liquid crystal display device in sectional view taken along lines II-II' and II'-II'' of FIG. 2(a).
Figure 2:
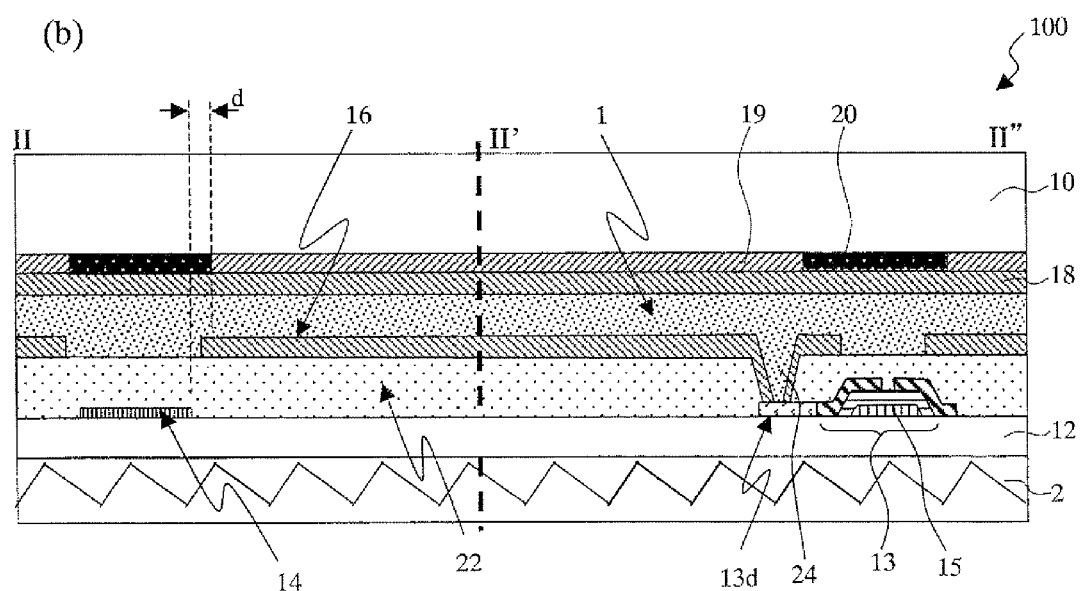

The display device 300 of this embodiment may be manufactured by the same method as the one employed for the conventional display device 100, which is illustrated in FIGS. 2(a) and 2(b), except that the black matrix 20 is designed to have a smaller width than the width of the wiring lines 14 and 15. This means no additional manufacture process for forming a non-retroreflection member, and therefore is advantageous.

A display device according to this embodiment may have other structures than the structure of the display device 300. It is sufficient in a display device of this embodiment if at least part of the wiring lines 14 and 15 or of the thin film transistor 13 is disposed in the opening 70. For examples instead of setting the width of the black matrix 20 small, the width of the wiring lines 14 and 15 may be widened along their entire or partial length, and hence part of the wiring lines 14 and 15 is placed in the opening 70. Also, in the display device 300 illustrated in FIG. 7, the position of the non-retroreflection region 70n defined by the wiring lines 14 and 15 and the shape of the non-retroreflection region 70n in plan view are not particularly limited, and a suitable location and shape may be selected.

While the display device 300 uses the wiring lines 14 and 15 as a non-retroreflection member, an auxiliary capacitance line may be used as a non-retroreflection member in addition to, or instead of, the wiring lines 14 and 15. An auxiliary capacitance line as such may be disposed, for example, close to the gate line or may run along the gate and source lines forming the shape of the letter C.

Third Embodiment

A third embodiment of a display device according to the present invention is described below with reference to the drawings. The display device of this embodiment is a retroreflection-type liquid crystal display device using a scattering-type liquid crystal, and has an external MCCA structure. In this embodiment, a reflective metal layer is provided as a non-retroreflection member between a rear substrate and a pixel electrode.

Figure 8:
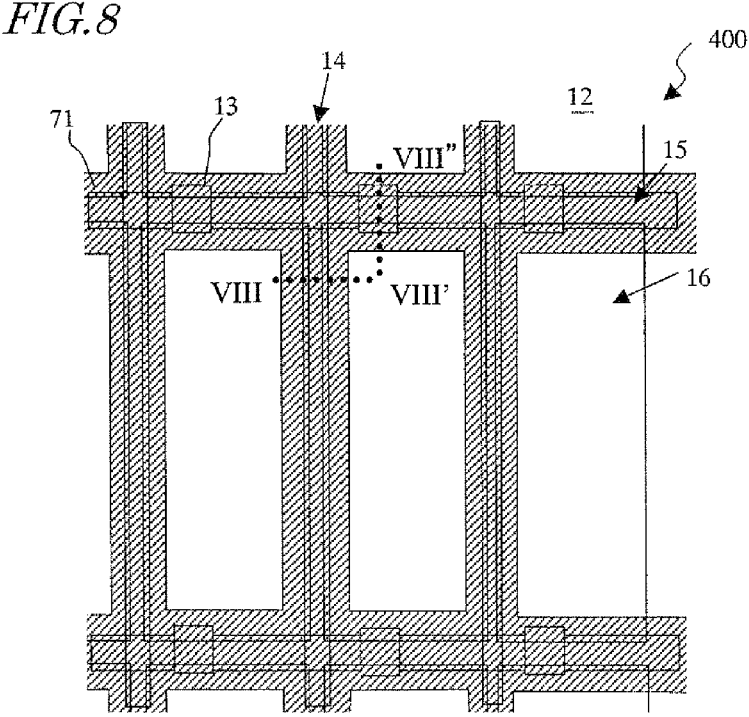
FIGS. 8(a) and 8(b) are diagrams illustrating a structure of a retroreflection-type liquid crystal display device according to a third embodiment of the present invention, with FIG. 8(a) illustrating in plan view a state of wiring lines and electrodes on a rear substrate of the retroreflection-type liquid crystal display device and FIG. 8(b) schematically illustrating the retroreflection-type liquid crystal display device in sectional view taken along lines VIII-VIII' and VIII'-VIII'' of FIG. 8(a).
Figure 8:
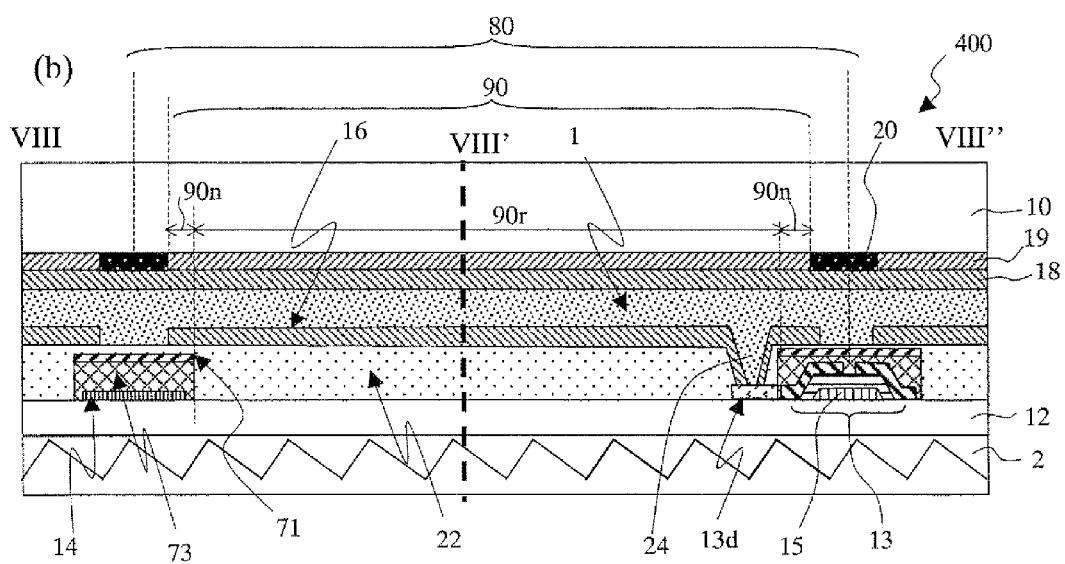

FIG. 8(a) is a plan view illustrating a state of wiring lines and electrodes on the rear substrate of the display device according to this embodiment. FIG. 8(b) is a diagram illustrating the display device of this embodiment, specifically, a schematic sectional view taken along lines VIII-VIII' and VIII'-VIII" in the plan view of FIG. 8(a). For the sake of simplification, components that are the same as those of the display device 100 are denoted by the same reference symbols and their descriptions are omitted.

In a display device 400, a reflective metal layer (Ag layer, for example) 71 is formed above the source line 14 and/or the gate line 15, which is formed on the rear substrate 12, with a passivation film (silicon nitride film, for example) 73 interposed between the reflective metal layer 71 and the wiring line 14 or 15. The reflective metal layer 71 is covered with the transparent resin layer 22, which electrically insulates the reflective metal layer 71 from the pixel electrode 16. At least part of the reflective metal layer 71 is not under the black matrix 20, which is provided on the front substrate 10, and is placed in an exposed state in an opening 90. The "opening 90" is a part of a pixel region 80 that is not shielded against light by the black matrix 20. In the display device 400, an end of the pixel electrode 16 and an end of the black matrix 20 substantially coincide with each other in a direction in which the layers are laminated, but the black matrix 20 may overlap with part of the pixel electrode 16.

In this embodiment, a part of the reflective metal layer 71 that is positioned in the opening 90 exerts a function as a non-retroreflection member by reflecting part of light that is about to enter the retroreflective layer 2 from the viewer side of the display device 400 in a direction different from the retroreflection direction (for example, regular reflection direction). The brightness in the white displaying state is thus improved as has been described with reference to FIGS. 4(a) and 4(b).

In the conventional display device 100 described with reference to FIGS. 2(a) and 2(b), the source lines 14 and the gate lines 15 need to be placed in a region that is shielded against light by the black matrix 20, and the width of the black matrix 20 therefore may not be set smaller than the width of the wiring lines 14 and 15. In this embodiment, on the other hand, the black matrix 20 needs to cover only a gap 58 between adjoining pixel electrodes 16 and may therefore be reduced in width. The substantial aperture ratio may be improved as a result.

The width of the reflective metal layer 71 is not particularly limited, but is preferably set such that the source line 14, the gate line 15, the thin film transistor 13, and other components formed on the rear substrate 12 are shielded against light by the reflective metal layer 71. This prevents the deterioration of displaying characteristics (black displaying characteristics, in particular) due to light incident on surfaces of the above-mentioned components.

This embodiment is similar to the above-mentioned embodiments in that the opening 90 has a non-retroreflection region 90n and a retroreflection region 90r. The non-retroreflection region 90n is defined by a part of the reflective metal layer 71 that is not shielded against light by the black matrix 20. The retroreflection region 90r is defined by a part of the retroreflective layer 2 that is not shielded against light neither by the black matrix 20 nor by the reflective metal layer 71.

A ratio Rn of the non-retroreflection region 90n to the opening 90 and a ratio Rr of the retroreflection region 90r to the opening 90 have the same preferred ranges as the ranges described in the first embodiment. The ratios Rn and Rr may be adjusted by choosing the size of the reflective metal layer 71 and the width of the black matrix 20 appropriately.

An example of how the reflective metal layer 71 and the pixel electrode 16 are formed in this embodiment is described next.

First, a silicon nitride film is formed by CVD on the rear substrate 12 where the thin film transistor 13 and the wiring lines 14 and 15 have been formed. The silicon nitride film is patterned to form the passivation film (thickness: 1,500 angstroms, for example) 73, which covers the wiring lines 14 and 15 and the thin film transistor 13. Next, a reflective metal film (Ag film) is vapor-deposited on the passivation film 73 and then patterned to form the reflective metal layer (thickness: 1,500 angstroms, for example) 71, which covers the wiring lines 14 and 15 and the thin film transistor 13. A transparent resin material is applied onto the reflective metal layer 71 by a spin coating technique to form the transparent resin layer 22. A contact hole that reaches a drain electrode 13d of the thin film transistor 13 is formed in the transparent resin layer 22. Thereafter, an ITO film is formed by deposition on the transparent resin layer 22, and patterned to obtain the pixel electrode 16.

The formation method for the reflective metal layer 71 is not limited to the above-mentioned method. The material of the reflective metal layer 71 may not be Ag but an Ag alloy such as AgPd or AgPdCu.

The arrangement and shape of the reflective metal layer 71 in this embodiment are not limited to the arrangement and shape illustrated in the drawings. The reflective metal layer 71 in this embodiment only needs to be placed between the pixel electrode 16 and the retroreflective layer 2 in the opening 90. The reflective metal layer 71 may be, for example, smaller in width than the wiring lines 14 and 15 to an extent that part of the wiring lines 14 and 15 is not shielded against light by the reflective metal layer 71. Also, while part of the reflective metal layer 71 in the display device 400 overlaps with the pixel electrode 16, a narrow reflective metal layer 71 may be formed so that the reflective metal layer 71 is covered with the pixel electrode 16.

The reflective metal layer 71 may have specular reflection characteristics, diffuse reflection characteristics, or any other reflection characteristics as long as they are not of retroreflection. Preferably, of a surface of the reflective metal layer 71, at least a part that functions as the non-retroreflection region 90n (part that is located in the opening 90) is a planar surface (plane mirror) having specular reflection characteristics. More desirably, this planar surface is disposed substantially parallel to the surfaces of the substrates 10 and 12. In this way, the deterioration of white displaying characteristics in some viewing directions is lessened more effectively as has been described with reference to FIGS. 4(a) and 4(b).

Placing the reflective metal layer 71 in at least part of the opening 90 is sufficient. For example, placing above merely any one of the gate line 15 and the source line 14 is enough to obtain the effect of improving the brightness of white displaying. Further, it is sufficient if the reflective metal layer 71 is placed in at least one of the openings 90 that constitute the display device 400.

Fourth Embodiment

A fourth embodiment of a display device according to the present invention is described below with reference to the drawings. The display device of this embodiment is a retroreflection-type liquid crystal display device using a scattering-type liquid crystal, and has an internal MCCA structure. The display device of this embodiment includes a reflection electrode, which functions as a pixel electrode and as a retroreflective layer both, and each opening is provided with a non-retroreflection region, which is above a contact portion for connecting the reflection electrode with a thin film transistor.

Figure 9:
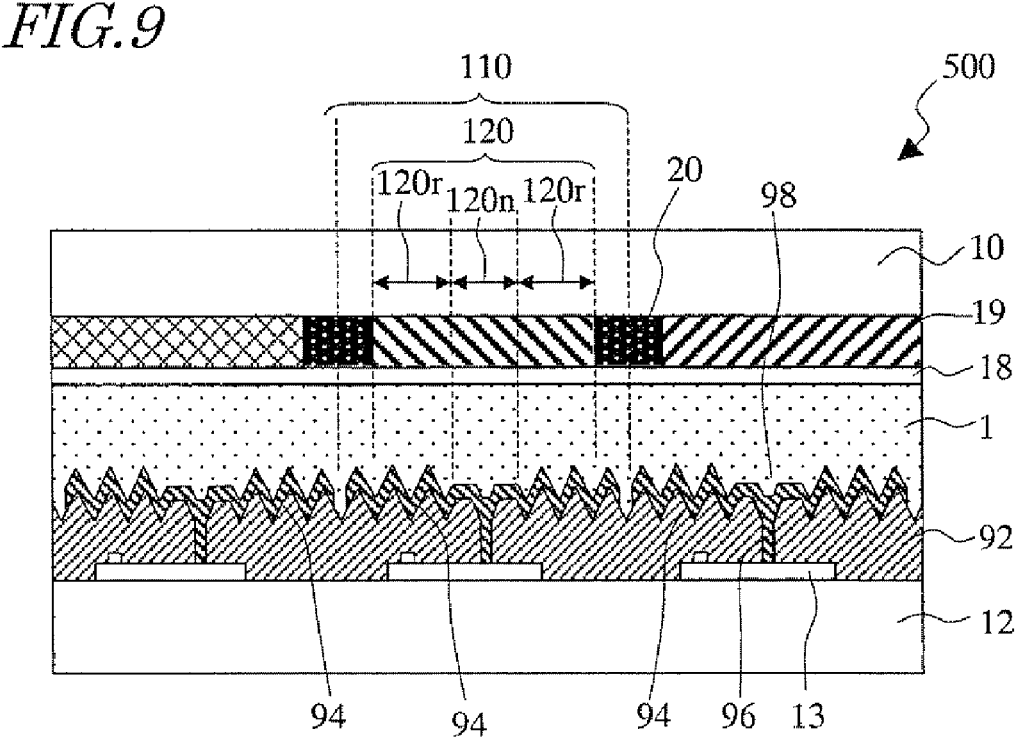
FIG. 9 is a schematic sectional view illustrating a retroreflection-type liquid crystal display device according to a fourth embodiment of the present invention.

FIG. 9 is a schematic sectional view of the display device of this embodiment.

A display device 500 includes a front substrate 10, where a color filter 19, a black matrix 20, and a counter electrode 18 are provided, a rear substrate 12, which is disposed to face the front substrate 10, and a light modulation layer 1, which is provided between the substrates 10 and 12. In this embodiment, a scattering-type liquid crystal layer is used as the light modulation layer 1. A plurality of thin film transistors 13 and wiring lines (not shown) are formed on the rear substrate 12. Formed on the thin film transistors 13 and the wiring lines, in the order stated, are an insulating layer 92, which has a surface shaped to exhibit retroreflection properties, and a plurality of reflection electrodes 94.

The plurality of reflection electrodes 94 are spaced apart from one another pixel by pixel. Each reflection electrode 94 is connected to a drain electrode of its associated thin film transistor 13 through a contact portion 96 formed in the insulating layer 92. Each reflection electrode 94 has an irregular surface that reflects the surface shape off the insulating layer 92. In the display device 500, the reflection electrode 94 exerts a function as a pixel electrode and a function as a retroreflective layer.

The reflection electrode 94 here has an MCCA shape and defines a retroreflection region 120r. However, as illustrated in the drawing, the surface of a part of the reflection electrode 94 that is above the contact portion 96 in the opening 120 defines a non-retroreflection region 120n. The non-retroreflection region 120n contains a substantially flat region as may be seen in the drawing. The "opening 120" is a part of a pixel region 110 that is not shielded against light by the black matrix 20.

Figure 10:
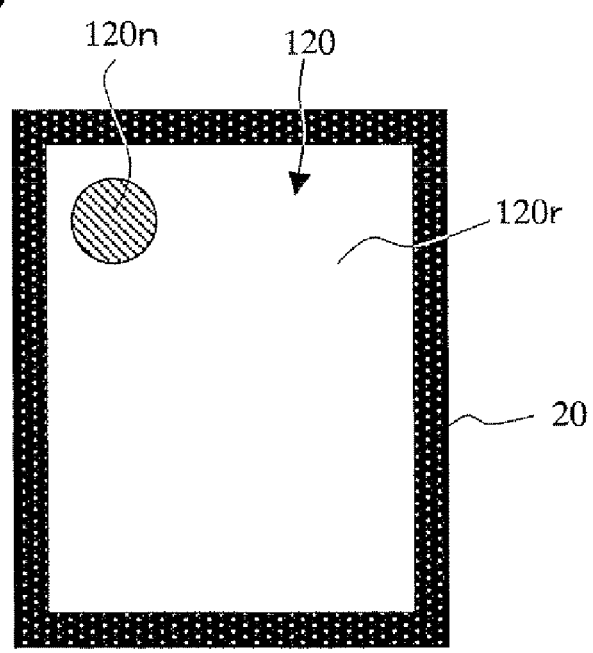
FIG. 10 is a plan view illustrating a structure of an opening according to the fourth embodiment of the present invention.

FIG. 10 is a plan view illustrating a single opening 120 of the display device 500 viewed from the normal line direction of the substrates 10 and 12.

In the plan view of FIG. 10, the area of the non-retroreflection region 120n is equal to or larger than the area of a concavo-convex unit feature in the reflection electrode 94, more desirably, 1.5 times the area of the unit feature or larger. In this way, the improvement in brightness of white displaying is ensured more firmly. The "area of the unit feature" viewed from the normal line direction of the surfaces of the substrates 10 and 12 is, when the reflection electrode 94 has, for example, a cubic corner cube array shape as the one illustrated in FIGS. 11(a) and 11(b), the area of a regular hexagon constituted by peak points and saddle points, or the area of a regular hexagon constituted by bottom points and saddle points, in a plan view of FIG. 11(b). A ratio Rn of the non-retroreflection region 120n to the opening 120 has the same preferred range as the range described in the first embodiment.

In this embodiment, in which the retroreflection region 120r and the non-retroreflection region 120n are placed in the opening, part of light that is about to enter the reflection electrode 94 from the viewer side of the display device 500 is reflected by the non-retroreflection region 120n in a direction different from the retroreflection direction (for example, regular reflection direction), and exits to the viewer side. The brightness in the white displaying state is thus improved as has been described with reference to FIGS. 4(a) and 4(b).

JP 2003-255373 A by the applicant of the present invention discloses findings in which, due to contact portions, reflection electrodes in a display device having an internal MCCA structure lose their MCCA shape and are substantially leveled. When a contact portion causes a reflection electrode to lose its MCCA shape and a substantially flat portion is formed as a result, however, the area of the substantially flat portion is about ½ of the area of the unit feature in the MCCA shape of the reflection electrode when viewed from the normal line direction of the substrate, and the white displaying characteristics may not be improved enough. This embodiment takes a totally opposite approach and utilizes the fact that a part of the reflection electrode 94 that is located above the contact portion 96 loses its retroreflection shape, by proactively forming a region 120n that does not have retroreflection characteristics (non-retroreflection region) in a given portion that contains the contact portion 96. The non-retroreflection region 120n in this embodiment is as large as the area of the unit feature in the MCCA shape or more, which is large enough to improve the white displaying characteristics.

The reflection electrode 94 having the non-retroreflection region 120n as this may be formed by, for example, the following method.

First, an MCCA having a plurality of convex portions and flat surfaces surrounding the convex portions is manufactured as a master. Next, an insulating layer is formed on the rear substrate 12 where the thin film transistors 13 and the wiring lines have been formed and, for example, the shape of the above-mentioned master is transferred to this insulating layer to obtain the insulating layer 92. A part of the insulating layer 92 that corresponds to the convex portions of the master constitutes a contact hole, whereas a part of the insulating layer 92 that is defined by the flat surfaces of the master constitutes the non-retroreflection region 120n. Subsequently, a metal film is formed by deposition on the insulating layer 92 and in the contact hole, and then patterned. As a result, a plurality of reflection electrodes 94 having the non-retroreflection regions 120n are formed while the contact portions 96 are formed in contact holes at the same time. The display device 500 of this embodiment may thus be manufactured without complicating the conventional manufacture process, and therefore is advantageous.

The light modulation layer 1 in the above-mentioned first through fourth embodiments may be any layer capable of switching between a transmitting state in which light incident on the light modulation layer 1 passes through the light modulation layer 1 maintaining its traveling direction (including cases where incident light travels while refracted) and a scattering state in which the traveling direction is changed by a scattering effect. For example, the light modulation layer 1 is constituted by a nematic-cholesteric phase transition type liquid crystal, a polymer-dispersed type liquid crystal which has a holographic function or a diffraction function, or a light scattering-type liquid crystal such as liquid crystal gel.

Preferably, a polymer-dispersed type liquid crystal is used as a scattering-type liquid crystal. A polymer-dispersed type liquid crystal is obtained by, for example, dissolving a mixture of a low-molecular-weight liquid crystal composition and an unpolymerized prepolymer in a compatible manner, placing the mixture between the front substrate 10 and the rear substrate 12 where electrodes and others have been formed, and then polymerizing the prepolymer. The prepolymer is not limited to a particular type but, preferably, a UV-curing prepolymer. When a UV-curing prepolymer is used, the above-mentioned mixture does not need to be heated in the polymerization, and adverse effects of heat on other members are thus avoided.

A polymer-dispersed type liquid crystal as the one described above may be formed by preparing a mixture (prepolymer/liquid crystal mixture) of a UV-curing prepolymer that exhibits liquid crystal properties and a liquid crystal composition (TL 213: a product of Merck, $\Delta n=0.238$), and photo-curing the mixture through irradiation of an active ray such as a UV ray. The prepolymer/liquid crystal mixture may be, for example, a prepolymer/liquid crystal mixture exhibiting the nematic liquid crystal phase at room temperature, which is obtained by mixing a UV-curing material and a liquid crystal at a weight ratio of 20:80 and adding a small amount of polymerization initiator (Irgacure 651: a product of Nihon Ciba-Geigy K.K.). The above-mentioned polymer-dispersed type liquid crystal is thus formed through UV-ray irradiation and does not need heat treatment. This lessens the damage brought by forming the light modulation layer 1 to other members that are formed on the front substrate 10 and the rear substrate 12.

Figure 11:
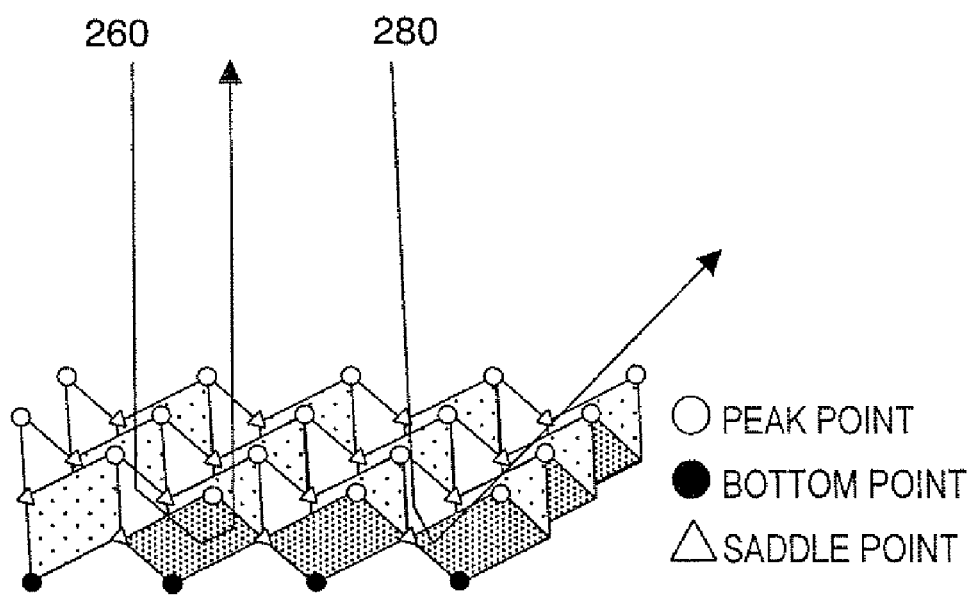
FIGS. 11(a) and 11(b) are, respectively, a perspective view and plan view illustrating a structure of a cubic corner cube array.
Figure 11:
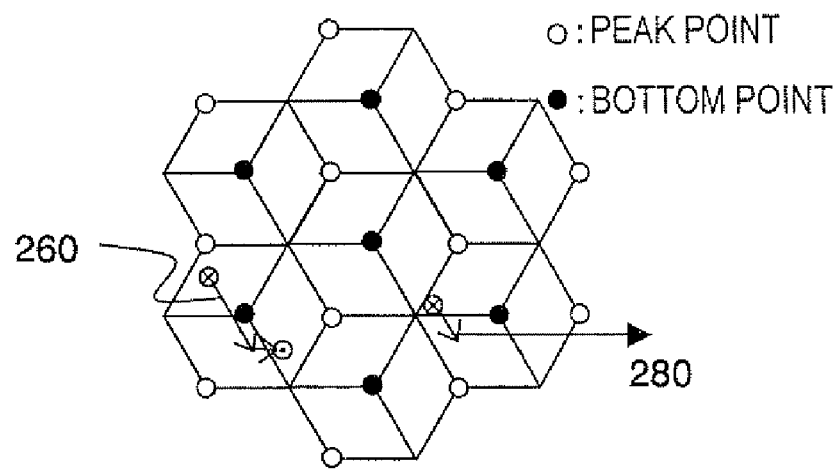

The retroreflective layer 2 in the above-mentioned first through fourth embodiments may be any reflection plate that has retroreflection characteristics, but is preferably a corner cube array, more desirably, a cubic corner cube array as the one illustrated in FIGS. 11(a) and 11(b). A cubic corner cube array is structured such that corner cubes each of which is constituted by three substantially square faces orthogonal to one another are arranged two-dimensionally. Cubic corner cube arrays have particularly excellent retroreflection characteristics among all types of corner cube array. The arrangement pitch of cubic corner cubes is preferably much smaller than the pixel pitch of a display device, for example, 5 μm or more and 50 μm or less.

The present invention is widely applicable to reflection-type display devices that use a scattering display mode and a retroreflection plate in combination. For example, the present invention is favorably applied to retroreflection-type liquid crystal display devices that use a polymer-dispersed type liquid crystal. A display device of this type may have an internally located structure in which a retroreflection plate is placed inside the display panel, or an externally located structure in which a retroreflection plate is placed on the rear side of the display panel. The present invention more effectively improves the displaying characteristics of retroreflection-type liquid crystal display devices having the externally located structure, particularly when a gap between the retroreflection plate and the rear substrate of the display panel is filled with a substance that has a refractive index of 1.06 or higher. Why it is so is described below.

In the case where the employed retroreflection plate is an MCCA as the one illustrated in FIGS. 11(a) and 11(b), light 260 enters perpendicularly to the MCCA as illustrated in the drawing. As illustrated in FIG. 11(b), the light 260 is reflected sequentially by three faces constituting a corner cube that the light 260 has entered (incident corner cube), and becomes retroreflected light that returns to the incident direction. Light 280, on the other hand, enters at an angle with respect to the perpendicular direction of the MCCA and, even when the tilt is as slight as a few degrees, part of the light 280 is reflected sequentially by two faces out of the three faces that constitute the incident corner cube as illustrated in FIG. 11(b). The light component does not enter the remaining face and therefore is not returned to the incident direction. Light like this which is reflected by only two faces constituting an incident corner cube is called "twice-reflected light". Twice-reflected light is generated also when light enters in a direction perpendicular to the MCCA if the MCCA shape precision (measured by normal line angle and planarity) is low.

In a display device where the MCCA is placed on the rear side of the display panel and a gap between the rear face of the display panel and the MCCA is filled with a substance having a refractive index of about 1.00 (for example, air), when the display device is in the white displaying state, part of twice-reflected flight exits to the viewer side after scattered by a liquid crystal layer, despite the viewer having a direct view of the display panel. This means that light that is twice-reflected light scattered by the liquid crystal layer may be utilized for the displaying of an image as well as light that is retroreflected light scattered by the liquid crystal layer. On the other hand, in a display device where a gap between the rear face of the display panel and the MCCA is filled with a substance having a refractive index of 1.06 or higher, when the viewer has a direct view of the display panel, twice-reflected light does not exit to the viewer side and accordingly may not be utilized for the displaying of an image. In such a display device, the lowering of the brightness and visibility in white displaying is more prominent, and applying the present invention improves the white displaying characteristics more effectively.

Examples

Examples 1 and 2 of the display device according to the present invention were manufactured, and their displaying characteristics were measured. The method and results are described. For comparison, a comparative example was manufactured, which had no non-retroreflection member, and similar measurements were taken.

As the comparative example, a display device having the same structure as that of the display device 100 described with reference to FIGS. 2(a) and 2(b) was manufactured first. The employed manufacturing method is as follows.

A glass substrate was used as the rear substrate 12. The thin film transistors 13, the source lines 14, the gate lines 15, and auxiliary capacitance lines were formed on the glass substrate. Though not illustrated in the drawings, the auxiliary capacitance lines were placed close to the gate lines 15. The source lines 14, the gate lines 15, and the auxiliary capacitance lines were formed from tantalum, tungsten, and molybdenum, respectively. A transparent resin material was applied by spin coating onto the thus obtained TFT substrate, to thereby form the transparent resin layer (thickness: 1 μm) 22. An ITO film was formed on the transparent resin layer 22 by deposition, and then patterned to form the pixel electrodes 16. Meanwhile, a glass substrate was used as the front substrate 10 to form the color filters 19, the black matrix 20, and the counter electrode 18 on the glass substrate. The black matrix 20 was disposed to cover the wiring lines (source lines 14, gate lines 15, and auxiliary capacitance lines) formed on the rear substrate 12. Thereafter, a surface of the rear substrate 12 on a side where the pixel electrodes 16 and other elements were formed and a surface of the front substrate 10 on a side where the counter electrode 18 and other elements were formed were faced against each other. A polymer-dispersed type liquid crystal was injected between the substrates to form the light modulation layer 1. Lastly, a retroreflection plate was matched with and attached to the rear side of the rear substrate 12 with the use of glycerin, thereby forming the retroreflective layer 2. The retroreflection plate employed was a cubic corner cube array having a 20-μm pitch.

In the obtained display device of the comparative example, a color filter opening area ratio was 74%. The R, G, and B filters are individually surrounded by black matrix segments, and the "color filter opening area ratio" means the area ratio of the filter to a portion enclosed by the center lines of the black matrix segments which is equal to the area ratio of an opening to a pixel region. The black matrix 20 completely shields the wiring lines 14 and 15 against light, and there is no non-retroreflection region in any of the openings. A ratio Rn of the non-retroreflection region to the opening is therefore 0%.

A display device of Example 1 has the same structure as that of the display device 200 described in the first embodiment with reference to FIGS. 5(a) and 5(b). The method employed to manufacture the display device of Example 1 is as follows.

A TFT substrate was fabricated by a method similar to the one employed in the above-mentioned comparative example. The transparent resin layer 22 was formed on the TFT substrate. On the transparent resin layer 22, the transparent conductive layers 51 were formed from an ITO film. Silver (Ag) was deposited by evaporation on the transparent resin layer 22 and the transparent conductive layers 51, and then patterned to form a plane mirror, which served as the reflective metal layer 53. The plane mirror was disposed to cover the thin film transistors 13 and the wiring lines 14 and 15 on the TFT substrate. A part of the plane mirror that is located in the opening 50, namely, the non-retroreflection region 50n, was given a width of 6 μm. In this manner, the pixel electrodes 56 constituted by the transparent conductive layers 51 and the reflective metal layer 53 were obtained. Meanwhile, the color filters 19, the black matrix 20, and the counter electrode 18 were formed on the front substrate 10 by a method similar to the one employed in the comparative example. In this example, however, the black matrix 20 did not need to completely shield the wiring lines 14 and 15 against light, and the width of the black matrix 20 was therefore set smaller than the width of the black matrix 20 in the comparative example. Next, the same material and method as in the comparative example were used to form the light modulation layer 1 between the front substrate 10 and the rear substrate 12. Thereafter, a retroreflection plate was attached to the rear side of the rear substrate 12 to form the retroreflective layer 2. The display device was thus completed.

In the display device of Example 1, the color filter opening area ratio was 87%, which was higher than the color filter opening area ratio in the comparative example. This is owing to the reduction in width of the black matrix 20 of this example from the width of the black matrix 20 in the comparative example. Further, the ratio Rn of the non-retroreflection region to the opening in Example 1 was 15%.

Figure 7:
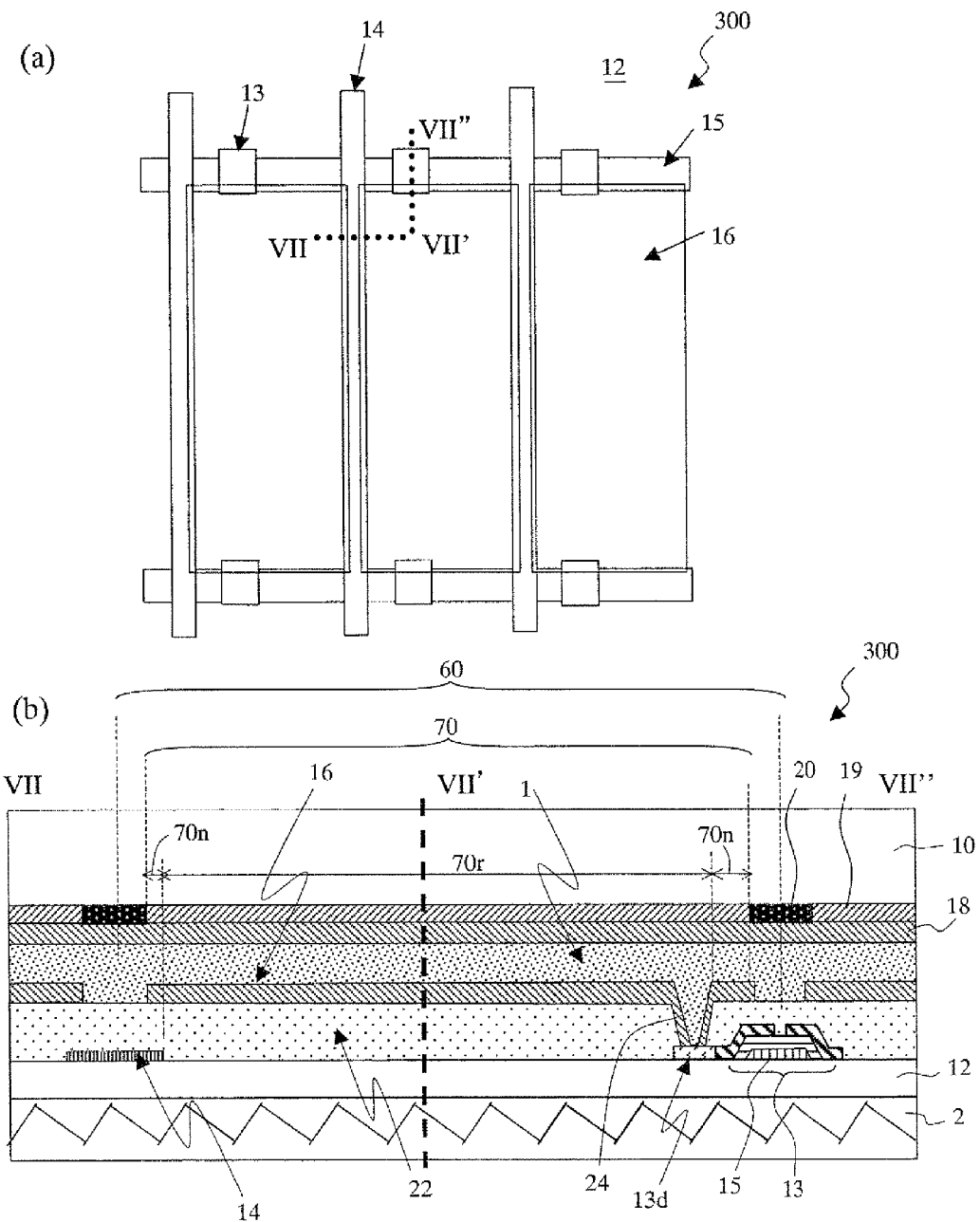
FIGS. 7(a) and 7(b) are diagrams illustrating a structure of a retroreflection-type liquid crystal display device according to a second embodiment of the present invention, with FIG. 7(a) illustrating in plan view a state of wiring lines and electrodes on a rear substrate of the retroreflection-type liquid crystal display device and FIG. 7(b) schematically illustrating the retroreflection-type liquid crystal display device in sectional view taken along lines VII-VII' and VII'-VII'' of FIG. 7(a).

A display device of Example 2 has the same structure as that of the display device 300 described in the second embodiment with reference to FIG. 7. The method employed to manufacture the display device of Example 2 was the same as the manufacturing method for the display device of the comparative example, except that the width of the black matrix 20 was set smaller than the width of the wiring lines 14 and 15. Specifically, in Example 2, the width of the source lines 14 and the gate lines 15 was set equal to the width of the source lines 14 and the gate lines 15 in the comparative example, and the black matrix 20 was set to a width smaller by 12 μm than the width of those wiring lines 14 and 15. As a result, the width of a part of the wiring lines 14 and 15 that is located in the opening 70, namely, the non-retroreflection region 70n, was 6 μm.

In the display device of Example 2, the color filter opening area ratio was 87% and the ratio Rn of the non-retroreflection region to the opening was 15%.

Described next is how the displaying characteristics of the display devices of Examples 1 and 2 and the comparative example obtained by the above-mentioned methods were evaluated.

For each of these display devices, Y values in the white displaying state and the black displaying state were measured with the use of a spectrophotometric colorimeter (CM-1000: a product of Konica Minolta Sensing, Inc.), and the display contrast ratio was calculated. The Y value is the reflectance in the XYZ (Yxy) color system, and corresponds to the "lightness". A specific measurement method is described below.

First, the display device for measurement was installed in a spectrophotometric calorimetric system, and its light modulation layer 1 was set in a scattering state (white displaying state). By using a light source and an integrating sphere, light was allowed to be incident on the display device in all directions, and intensity Iw of the light which was reflected in a direction perpendicular to the substrate of the display device was measured with a photodetector. The focusing angle of the photodetector was 10 degrees. On the other hand, as a reference, a perfectly diffuse plate was installed on this colorimetric system instead of a display device, and within the light which was reflected by the perfectly diffuse plate, intensity Ir of the light heading in a direction perpendicular to the perfectly diffuse plate was measured with the photodetector. A ratio (Iw/Ir) (%) of the aforementioned light intensity Iw relative to the light intensity Ir when using the reference was calculated, and defined as a brightness of white displaying of the display device.

Next, after switching the light modulation layer 1 of the display device into a transmitting state (black displaying state), light was allowed to be incident on the display device in all directions in a similar manner to the above, and intensity Ib of the light being reflected in a direction perpendicular to the substrate of the display device was measured with the photodetector. A ratio (Ib/Ir) (%) of the intensity Ib thus obtained relative to the light intensity Ir when using the reference was calculated, and defined as a brightness of black displaying.

Further, from the brightnesses of black displaying and white displaying obtained in the above-mentioned manner, a display contrast ratio (Iw/Ib) was determined.

For each of the display devices, the visibility in the white displaying state was also evaluated when the viewing direction and a direction in which light from the light source enters (is reflected by retroreflection) were relatively close to each other, and when the viewing direction and the retroreflection direction were significantly distant from each other in the opposite directions with respect to the normal line direction of the panel.

Table 1 indicates results of measuring the brightness of white displaying and the contrast ratio in the display devices of Examples 1 and 2 and the comparative example. The "white displaying brightness (%)" in Table 1 is a value calculated in the above-mentioned manner with the brightness of the perfectly diffuse plate set as 100%.

TABLE 1

|  | Example 1 | Example 2 | Comparative example |
| --- | --- | --- | --- |
| White displaying brightness | 22% | 18% | 15% |
| Display contrast ratio | 7.5 | 5.8 | 7.1 |
| Width of non-retroreflection region | 6 μm | 6 μm | — |
| Ratio Rn of non-retroreflection region to opening | 15% | 15% | 0% |
| Color filter opening area ratio | 87% | 87% | 74% |

The results indicated in Table 1 reveal that brighter white displaying than in the comparative example is obtained in both of Examples 1 and 2 which are provided with a non-retroreflection member according to the present invention. While the comparative example completely shields a wiring line part in the pixel region against light with the black matrix 20, Examples 1 and 2 place a non-retroreflection region in this wiring line part, thereby substantially raising the aperture ratio and enhancing the intensity (intensity of the above-mentioned reflected light) Ib of light that contributes to the displaying of an image. In Example 1, the displayed image was even brighter than in Example 2. This is because, though those examples have the same area ratio of the non-retroreflection region, Example 1 uses a plane mirror of silver high in reflectance as a non-retroreflection member and thus enhances the intensity Ib of the reflected light even more, whereas Example 2 uses the top faces of the wiring lines 14 and 15 as a non-retroreflection member.

In Example 1, black displaying, too, is brighter than in the comparative example. However, Example 1 is greatly improved in brightness of white displaying, and hence a high contrast ratio is obtained in the end. Black displaying is better in Example 1 than in Example 2, because the display device of Example 1 covers the thin film transistor 13, which, having a complicated structure, causes scattering, with a plane mirror.

In Example 2, white displaying brighter than in the comparative example is accomplished but the display contrast ratio is low because of extremely bright black displaying. However, the display contrast ratio may be improved to a level equal to that of the comparative example or higher by optimizing the reflectance of wiring line metal or reducing scattering at the wiring line edges.

Visibility evaluation results are described next.

In the display devices of Examples 1 and 2, the visibility was higher than in the display device of the comparative example irrespective of in what environment the display devices are set up. The visibility of the display devices of Examples 1 and 2 was far superior to the visibility of the display device of the comparative example particularly when the viewing direction and the light source direction with respect to the panel are significantly distant from each other. As has been described with reference to FIG. 3 and FIG. 4, in the display devices of Examples 1 and 2, the scattered light Lb which is scattered after reflected by a non-retroreflection member contributes to the displaying of an image in addition to the scattered light La which is centered around the retroreflection direction, with the result that the displayed image is bright even when viewed from a direction that is difficult for the scattered light La to reach. In this manner, the deterioration of white displaying characteristics in some viewing directions is lessened considerably, which is enough to compensate for the slight deterioration of black displaying characteristics due to the non-retroreflection region, and the visibility is ultimately enhanced.

The environment (e.g., relation between the light source direction and the viewing direction) in which the display devices are set up was varied more diversely. As a result, it was found that the display device of Example 1 is superior in visibility to the display device of Example 2 under all the environments. The probable reason is that the aforementioned fact that the display device of Example 1 is superior in white displaying characteristics and black displaying characteristics both to the display device of Example 2 enables the display device of Example 1 to display a high visibility image irrespective of the light source location and the viewing point.

INDUSTRIAL APPLICABILITY

The present invention is widely applicable to the reflection-type display devices that use the scattering display mode and the retroreflection plate in combination. For example, the present invention is favorably applied to the retroreflection-type liquid crystal display devices that use the polymer-dispersed type liquid crystal. Of such display devices, in particular, it is possible to more effectively improve the displaying characteristics by applying the present invention to retroreflection-type liquid crystal display devices having an externally located structure in which a gap between the retroreflection plate and the rear side of the display pane is filled with a substance that has a refractive index of 1.06 or higher, and retroreflection-type liquid crystal display devices having an internally located structure in which the retroreflection plate is placed inside the display panel.

The invention claimed is:

1. A reflection-type display device with a plurality of pixel regions, comprising:
   a light modulation layer;
   a front substrate and a rear substrate between which the light modulation layer is held;
   an electrode structure for varying optical characteristics of the light modulation layer for each pixel region;
   a retroreflective layer which is placed on a rear side of the light modulation layer; and a non-retroreflection member which is placed on the rear side of the light modulation layer and which has reflection characteristics different from retroreflection, wherein the front substrate comprises a light shielding layer which defines an opening in the each pixel region, and wherein the opening contains a non-retroreflection region, which is defined by the non-retroreflection member, and a retroreflection region, which is defined by the retroreflective layer.

2. The reflection type display device according to claim 1, wherein, when viewed from a normal line direction of the rear substrate, the non-retroreflection region takes up ⅓ or less of an entire area of the opening.

3. The reflection-type display device according to claim 1, wherein the non-retroreflection region is disposed at a rim of the opening.

4. The reflection-type display device according to claim 1, wherein the non-retroreflection member is interposed between the retroreflective layer and the light modulation layer to reflect part of light entering the retroreflective layer from a viewer side in a direction different from a retroreflection direction.

5. The reflection-type display device according to claim 1, further comprising wiring lines which are formed on the rear substrate,
wherein part of the wiring lines is placed within the opening to function as the non-retroreflection member.

6. The reflection-type display device according to claim 1, wherein the electrode structure comprises:
a counter electrode, which is formed on the front substrate; and
pixel electrodes, which are formed on the rear substrate and spaced apart from one another for the each pixel region,
wherein the pixel electrodes each comprise:
a reflective metal layer; and
a transparent conductive layer, and
wherein at least part of the reflective metal layer is placed within the opening to function as the non-retroreflection member.

7. The reflection-type display device according to claim 1, wherein the electrode structure comprises:
a counter electrode, which is formed on the front substrate; and
pixel electrodes, which are formed on the rear substrate and spaced apart from one another for the each pixel region,
wherein the reflection-type display device further comprises a reflective metal layer, which is placed between the pixel electrodes and the retroreflective layer, and
wherein at least part of the reflective metal layer is placed within the opening to function as the non-retroreflection member.

8. The reflection-type display device according to claim 6, wherein the wiring lines formed on the rear substrate are shielded against light by the light shielding layer and the reflective metal layer.

9. The reflection-type display device according to claim 1, wherein the non-retroreflection member comprises a substantially flat non-retroreflection region.

10. The reflection-type display device according to claim 9, wherein the non-retroreflection region is parallel to the rear substrate.

* * * * *